US009286455B2

(12) United States Patent
Senthurpandi

(10) Patent No.: US 9,286,455 B2
(45) Date of Patent: Mar. 15, 2016

(54) REAL IDENTITY AUTHENTICATION

(71) Applicant: MSI Security, Ltd., McLean, VA (US)

(72) Inventor: Janarthanan Senthurpandi, McLean, VA (US)

(73) Assignee: MSI Security, Ltd., McLean, VA (US)

( * ) Notice: Subject to any disclaimer, the term of this patent is extended or adjusted under 35 U.S.C. 154(b) by 0 days.

(21) Appl. No.: 13/645,479

(22) Filed: Oct. 4, 2012

(65) Prior Publication Data

US 2014/0101453 A1    Apr. 10, 2014

(51) Int. Cl.
G06F 21/32     (2013.01)
H04L 29/06     (2006.01)
H04L 9/32      (2006.01)

(52) U.S. Cl.
CPC ............ *G06F 21/32* (2013.01); *H04L 63/0861* (2013.01); *H04L 9/3231* (2013.01)

(58) Field of Classification Search
CPC ..... G06F 21/34; G06F 21/32; H04L 63/0861; G07C 9/00087
USPC ........ 713/172, 185, 186; 726/9, 20; 340/5.82, 340/5.83; 382/115
See application file for complete search history.

(56) References Cited

U.S. PATENT DOCUMENTS

| | | | |
|---|---|---|---|
| 6,678,821 B1 * | 1/2004 | Waugh et al. | 713/168 |
| 7,069,444 B2 * | 6/2006 | Lowensohn et al. | 713/185 |
| 7,447,911 B2 * | 11/2008 | Chou et al. | 713/186 |
| 7,805,614 B2 * | 9/2010 | Aull et al. | 713/186 |
| 8,341,714 B2 * | 12/2012 | Muller et al. | 726/9 |
| 8,421,595 B2 * | 4/2013 | Cassone | 340/5.82 |
| 2007/0237366 A1 * | 10/2007 | Maletsky | 382/115 |
| 2012/0023556 A1 * | 1/2012 | Schultz et al. | 726/4 |
| 2013/0111222 A1 * | 5/2013 | Joyce, III | 713/194 |

\* cited by examiner

*Primary Examiner* — Saleh Najjar
*Assistant Examiner* — Louis Teng
(74) *Attorney, Agent, or Firm* — John F. Rollins

(57) ABSTRACT

A real identity biometric authentication device includes a USB thumb drive form factor, with a biometric sensor and designated device processor and stored instructions in firmware which perform authentication in a secure manner, independent of processing and storage resources on a host platform. The device and authentication process require biometric data and are secured against effects of malware or other security risks presented by applications running on the host platform. During an enrollment process, a unique encrypted enrollment biometric token is created using biometric data and uploaded securely to an authentication server. During an authentication process, the encrypted enrollment biometric token is downloaded to the real identity authentication device firmware and is decrypted on the device. The biometric data obtained from the decrypted data and is compared with live, real-time biometric data obtained from the user, for example, by a real-time fingerprint scan. If the real-time biometric data and the enrolled, decrypted biometric data match, the user is authenticated.

15 Claims, 8 Drawing Sheets

REAL IDENTITY AUTHENTICATION

BACKGROUND

1. Technical Field

The present disclosure relates to the field of information security and authentication devices, systems and processes. More specifically, the present disclosure relates to authentication devices, systems and processes that utilize biometric information to identify and authenticate a user.

2. Background Information

Various methods, devices and systems have been devised to ensure secure authentication of users desiring to access a secure network or computer resources within an enterprise and other environments. In addition to the use of traditional usernames and passwords, other approaches and technologies have evolved. For example, the SecureID™ authentication technology developed by RSA Security, a division of EMC Corporation, controls access to VPN's or other secure networks using a token held in the user's possession which displays a time-varying code to the user. The user inputs the code in combination with a PIN in order to verify the user's ID. Variants of this technology, including the RSA SecureID™ 800 product, provide a USB drive form factor and support a master key and storage of password information on a USB storage device provided with encryption technology. Such authentication technology is vulnerable to security risks insofar as knowledge of the user's PIN and possession of the hardware token are all that are needed for access to secure network resources. Additionally, software solutions that require specific server administration interfaces present a known target and methodology for individuals to attack. Other technologies, such as the Vector Segment Technology™ provided by Bio-Key International of Wall, N.J., include software-based fingerprint authentication applications that require additional hardware to be present for use by the user.

Such technologies, while more robust than traditional username/password authentication, still suffer from the drawback that the authentication is not "real" in the sense that there still exists a risk that the person or entity with the token device and username/password information is not the real person assumed to be in possession of both. Another drawback is that, even in cases where the true person is inputting the authentication information, it is still typically typed in by a user and transmitted, possibly unencrypted, over the network and is thus susceptible to various security risks, including phishing or interception.

Biometric devices, which typically sense or detect one or more immutable, biological attributes, have been utilized to provide improved identification of individuals desiring access to physical and network environments. However, biometric authentication has not been widely adopted in the area of authentication of users of secure physical and network resources. The most significant challenges to adopting biometric authentication are the need for additional equipment, including multiple devices for the same individual and the lack of portability as the biometric technology is typically physically integrated with individual computer hardware. In addition, some systems utilize local storage of actual fingerprint images, which presents a security risk. Still further, software-based systems perform matching within the software are therefore open to hacking, man-in-the-middle attacks, phishing, etc. Yet another challenge arises when specific client side certificates or other security related applications are required to be installed. In addition, portability and mobility of authentication capabilities are impaired when authentication devices and processes become platform or device specific.

Accordingly, there is a need in the art for authentication devices, systems and processes that address the aforementioned shortcomings and disadvantages.

SUMMARY OF THE INVENTION

Aspects of the invention provide a real identity biometric authentication device, process, methods and systems that address the aforementioned shortcomings in the prior art.

More specifically, devices systems, methods and devices according to aspects of the invention provide secure processing and memory resources on the device, such that biometric authentication processes may be done independently of computing resources on a host platform. Devices according to an aspect of the invention may be provided with a USB thumb drive form factor, with an integrated biometric sensor, such as a fingerprint sensor. A biometric token creation module, encryption/decryption module, device and user information storage and biometric sensor interface may be implemented in firmware or other storage in which the instructions and data can be secured against effects of malware or other applications running on a host platform. A device processor, which may be a microcontroller, provides exclusive support of the execution of firmware instructions, such that authentication of the device and user with an authentication server occurs without dependence on the host platform for steps involved in the authentication process and, therefore, without risk of corruption or other effects of applications or instructions executing or stored on the host platform.

During an enrollment process, an enrollment biometric token is created using biometric data, which may include fingerprint data, and other data that may include device identification data, application identification data, username and password. During the enrollment process, the enrollment data are encrypted on the portable authentication device in firmware or other storage that is isolated from the host platform. The encrypted biometric token is sent to a web server for storage and use in future authentication processes.

During an authentication process, the enrollment biometric token created during the enrollment process, and located on the web server, is downloaded to the device firmware and is decrypted on the device. This occurs in a controlled environment, preferably in firmware and isolated from the host platform. The biometric data is obtained from the decrypted data and is compared with live, real-time biometric data obtained from the user, for example, by a real-time fingerprint scan. If the real-time biometric data and the biometric data in the enrollment biometric token match, the device generates an authentication token, which may include device identifying information, application identification information, which identifies the application through which the user is accessing the authentication process, the user's username, password and a timestamp. The authentication token is encrypted and sent to the authentication server and the user is authenticated. Since the comparison and decryption of authentication data takes place in device firmware, and isolated from applications and resources of the host platform, the authentication processes and data are not subjected to the security risks that might be present on the host platform.

The disclosed portable biometric authentication devices, systems and processes, according to aspects of the invention, eliminate the security risks associated with prior art approaches that lack verification of the real or true identity of a user. The biometric authentication devices, systems and processes according to aspects of the invention also eliminate or reduce security risks associated with communicating unencrypted authentication-related data within a network. The invention provides for real identification of a user's using biometric information. Moreover, the invention provides for secure, firmware level enrollment and authentication, including a comparison of enrollment and authentication data within a secure environment, in firmware or otherwise isolated from and impervious to effects from the host platform. The invention further eliminates the sending and receiving of unencrypted authentication data, and thus eliminates the potential for interception of authentication or other sensitive data.

Aspects of the invention also provide for multiple enrolled users on a single authentication device. An encrypted biometric token may be created during an enrollment process for each of the multiple users, and stored on an authentication server in a lookup table or other database that associates the user's username, password and enrolled device with a biometric token created for that user during the enrollment process. The appropriate biometric tokens are downloaded to the device and decrypted. Then a real-time comparison is done between the decrypted biometric tokens and real-time biometric data obtained from the user, for example, from a fingerprint swipe. If the real-time and downloaded biometric information match, an authentication token, which may include device identifying information, application identifying information, username, password and timestamp, is created, encrypted and sent to the authentication server, which authenticates the user.

Aspects of the invention further provide for group, user, application and device management. Groups of users may be associated with a single real identity authentication device. Moreover, a single user may be associated with more than one authentication device. Profiles may be created and managed for users and devices. Different applications and access rights may be associated with each of multiple users. An administrative portal may be provided to permit an administrator to manage the groups, users, applications and devices.

BRIEF DESCRIPTION OF THE DRAWINGS

The features and attendant advantages of the invention will be apparent from the following detailed description together with the accompanying drawings, in which like reference numerals represent like elements throughout. It will be understood that the description and embodiments are intended as illustrative examples and are not intended to be limiting to the scope of invention, which is set forth in the claims appended hereto.

DETAILED DESCRIPTION

It will be understood, and appreciated by persons skilled in the art, that one or more processes, sub-processes, or process steps described in connection with the Figures included herewith may be performed by hardware, firmware and/or software. If the process is performed by software or firmware, the software or firmware may reside in software or firmware memory in a suitable electronic processing component or system such as one or more of the functional components or modules schematically depicted in the Figures. The software in software memory may include an ordered listing of executable instructions for implementing logical functions (that is, "logic" that may be implemented either in digital form such as digital circuitry or source code or in analog form such as analog circuitry or an analog source such as analog electrical, sound or video signal), and may selectively be embodied in any computer-readable medium for use by, or in connection with, an instruction execution system, apparatus, or device, such as a computer-based system, processor-containing system, or other system that may selectively fetch the instructions from the instruction execution system, apparatus, or device and execute the instructions. In the context of this disclosure, a "computer-readable medium" is any means that may contain, store or communicate the program for use by, or in connection with, the instruction execution system, apparatus, or device. The computer readable medium may selectively be, for example, but is not limited to, an electronic, magnetic, optical, electromagnetic, infrared, or semiconductor system, apparatus or device. More specific examples, but nonetheless a non-exhaustive list, of computer-readable media would include the following: a portable computer diskette (magnetic), a RAM (electronic), a read-only memory "ROM" (electronic), an erasable programmable read-only memory (EPROM or Flash memory) (electronic), and a portable compact disc read-only memory "CDROM" (optical).

Figure 1:
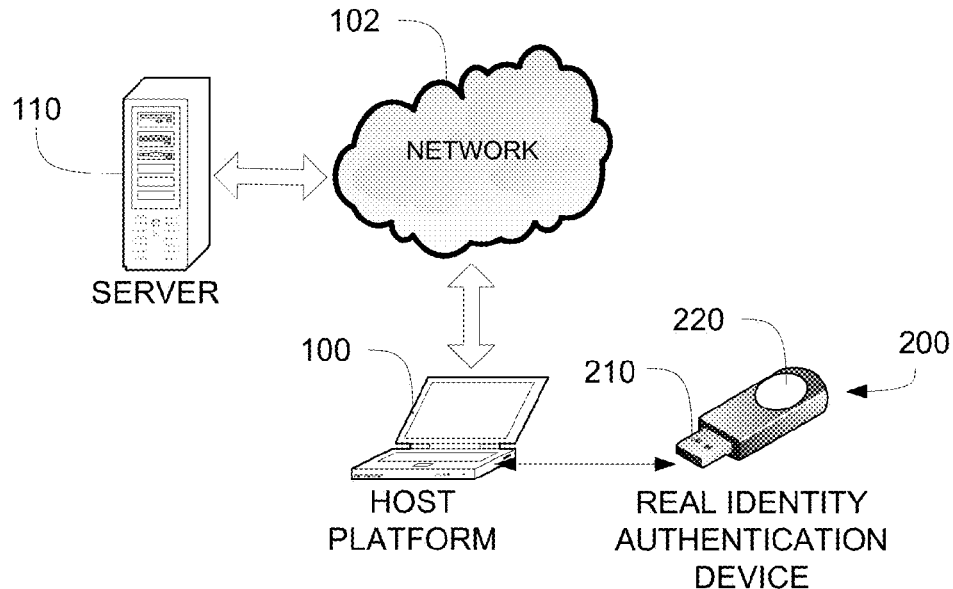
FIG. 1 illustrates an exemplary network environment suitable for supporting a real identity authentication device, method and system according to an aspect of the invention.

FIG. 1 illustrates an exemplary network environment suitable for supporting a real identity authentication device, method and system according to an aspect of the invention. A host platform 100 may include a client computing device, such as a notebook computer, mobile device or other computing platform, which may communicate with a wide area network (WAN) 102, such as the World Wide Web or Internet. One or more server devices 110 may communicate with the host platform 100 over the WAN 102. A real identity biometric authentication device 200, according to an aspect of the invention, may have the form factor of a USB thumb drive and may interface with the host platform 100 via USB interface 210. Real identity authentication device may include a biometric sensor 220, which may include a fingerprint recognition device.

Figure 2:
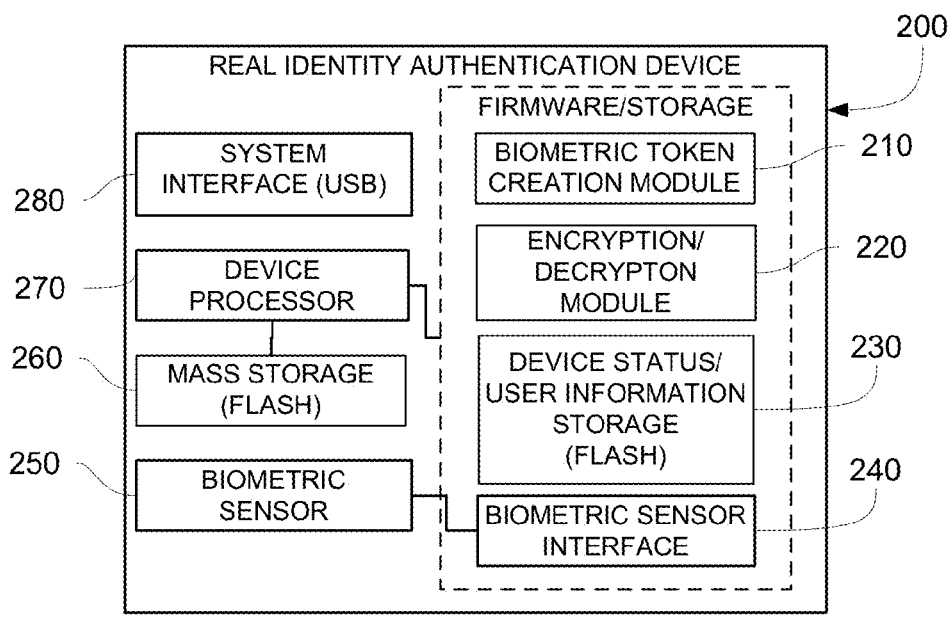
FIG. 2 is a block diagram showing components of a real identity authentication device according to an aspect of the invention.

FIG. 2 is a schematic block diagram showing functional components or modules of a real identity biometric authentication device 200 according to an aspect of the invention. The real identity authentication device 200 may include a storage containing instructions representing a biometric token creation module 210, encryption/decryption module 220, device status/user information storage 230 and biometric sensor interface 240. According to a further aspect of the invention, these components or modules may be implemented by instructions stored in firmware, or other memory or storage that is not generally accessible to the host platform computing resources. The real identify biometric authentication device further includes a device processor 270, which may be a microcontroller. According to aspects of the invention, device processor 270 may have exclusive access to and control over the components or modules in firmware storage and thus may exclusively process the instructions representing the biometric token creation module 210, encryption/decryption module 220, device status/personal information storage 230 and biometric sensor interface 240 during authentication, without dependence on host platform processing or storage resources. The real identity biometric authentication device 200 may further comprise a biometric sensor 250, mass storage 260, and host platform (system) interface 280, which may be a USB interface. Device processor 270 may communicate via data bus with the other elements on the device, including firmware/storage, mass storage 260, and host platform interface 280.

The function of biometric token creation module 210 is to create a unique token or key that incorporates a number of data elements, including biometric data, as will be described in more detail below with reference to FIG. 7. The function of encryption/decryption module 220 is to provide encryption and decryption of data input to the module. Encryption/decryption module may utilize any known, symmetric-key encryption technology, such as symmetric-key algorithms defined by Advanced Encryption Standard (AES) 256-bit or even 512-bit encryption standards.

Device status and user information storage 230 may be a flash memory storage and provides a storage area, preferably in firmware or other non-volatile, secure memory or storage, to store information such as device identification data, including MAC address, application identification data, username and password in a secure manner.

According to an aspect of the invention, real-identity authentication device may be provided with components and a secure operating system, which allows the host platform 100 to boot the portable operating system from the real identity authentication device 200. The device status and user information storage 230, may generally be logically organized into a device status section and a user information storage section. Device status section may include a secure status indicator, which may indicate that the memory state is either secure or public, a file system format indicator, which may indicate that the partition file format is either CDFS format or FAT format.

The device status section may also include data indicating the enrollment state (i.e., whether there are any enrolled users or not, and whether the enrollment volume limit is exceeded), as well as data indicative of the device name, the name of the device represented in the NETBIOS of the host system, and the date and time that the device was enrolled by a user. The user information section may contain a memory section for each enrolled user associated with the device. An exemplary format may contain an enrollment status indicator, user name information, year, month and date of last login, biometric identification information, access permission information, and associated administrator. According to an aspect of the invention, device status and user information storage 230 is preferably flash memory, which allows true random access. The above storage scheme permits storage for a number of users within a relatively small memory space. For example, each user's information may be represented in a memory section of 512 bytes of data, such that a 512 Kbyte memory space can contain information on up to 99 users.

Biometric sensor interface 240 supports the interaction of biometric sensor 250 with the other components and modules of the real identity authentication device 200, and may include drivers and supporting applications and data for enabling such interaction. According to one aspect of the invention, biometric sensor 250 is a fingerprint recognition sensor for sensing a fingerprint image of a user.

One advantage that will be recognized in real identity authentication devices according to aspects of the invention is that the devices retain flexibility in what type of encryption may be utilized. Since encryption and decryption capabilities are provided by device computing resources within a controlled environment—that is, within the firmware and by the device processor 270 (FIG. 2) on the device itself—enterprises may adopt different encryption/decryption methods and standards by re-tasking the firmware, for example, using a software development toolkit. An associated advantage is that the device storage capacity does not restrict adoption of particular encryption methods. In other words, since devices according to aspects of the invention obtain only a single biometric token from the remote authentication server, and perform encryption/decryption within the firmware on the device itself, large databases of biometric template data are not required to be managed. Moreover, encryption methods that require more computing resources may be utilized without corresponding increase in the storage capacity requirements of the device or authentication server.

It will be recognized that biometric sensor may be any device intended to recognize a biometric parameter. Mass storage 260 may be flash memory which functions to store data such instructions and data for implementing one or more operating systems and one or more applications for the real identity authentication device 200 as well as for the host platform.

Processor 270 functions to access memory or storage and execute instructions onboard the real identity authentication device 200. System interface 280, which may be a USB interface, provides an interface between the real identity authentication device 200 and the host platform 100 (FIG. 1).

Figure 3:
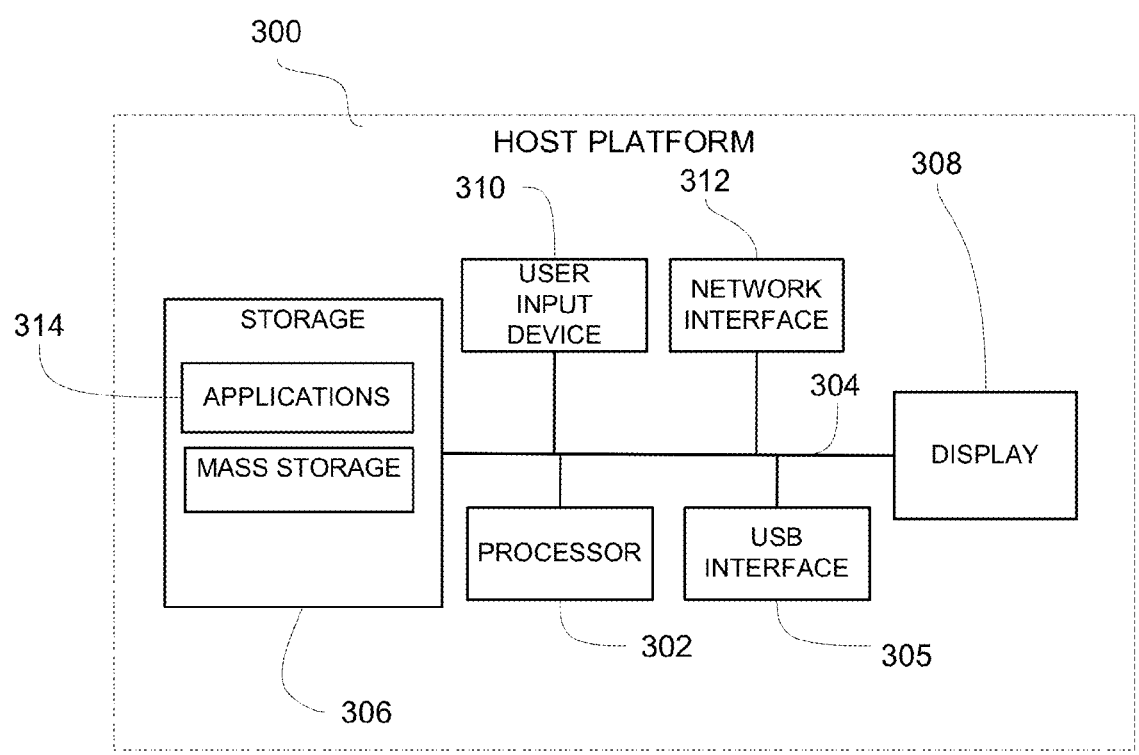
FIG. 3 is a block diagram of a host platform or environment and a block diagram of a real identity authentication device interfaced with the host platform according to an aspect of the invention.

FIG. 3 is a schematic block diagram illustrating elements of a client computer platform, 300, suitable for supporting an authentication system according to an aspect of the invention. As will be recognized, the server 110 (FIG. 1) may include similar components and architecture to those described herein. Elements of the client computer 300 may include a processor 302, which communicates via an electronic data bus 304 with a storage or memory 306, display 308, user interface 310 USB interface 305 and network interface 312. Processor 302 may execute instructions representing applications 314 stored in storage 306. Storage 306 also contains mass storage 316 for storing data and instructions. Real identity authentication device 200 communicates via the onboard USB interface 280 with the client computer USB interface 305.

It will be recognized that devices according to aspects of the invention establish a direct and exclusive communication with the remote authentication server. In other words, there are no host platform processing or memory resources utilized in the authentication process performed by the real identity authentication device when authenticating with the remote authentication server. The host platform 100 may provide power, hardware and software support for standard network interfaces and secure communication protocols, such as Secure Socket Layer (SSL) to establish a generally secure communication link between the host platform and a remote server. But the authentication process performed by the real identity authentication device is done independent of host platform processing or memory resources. This is in accordance with the enhanced security capabilities provided by devices according to aspects of the invention. In other words, the device processor 270 (FIG. 2) and firmware components or modules (FIG. 2) preferably provide exclusive support of the interaction with the authentication server to authenticate the user. This is supported by the extended processing capabilities of the device processor on devices according to aspects of the invention.

Figure 4:
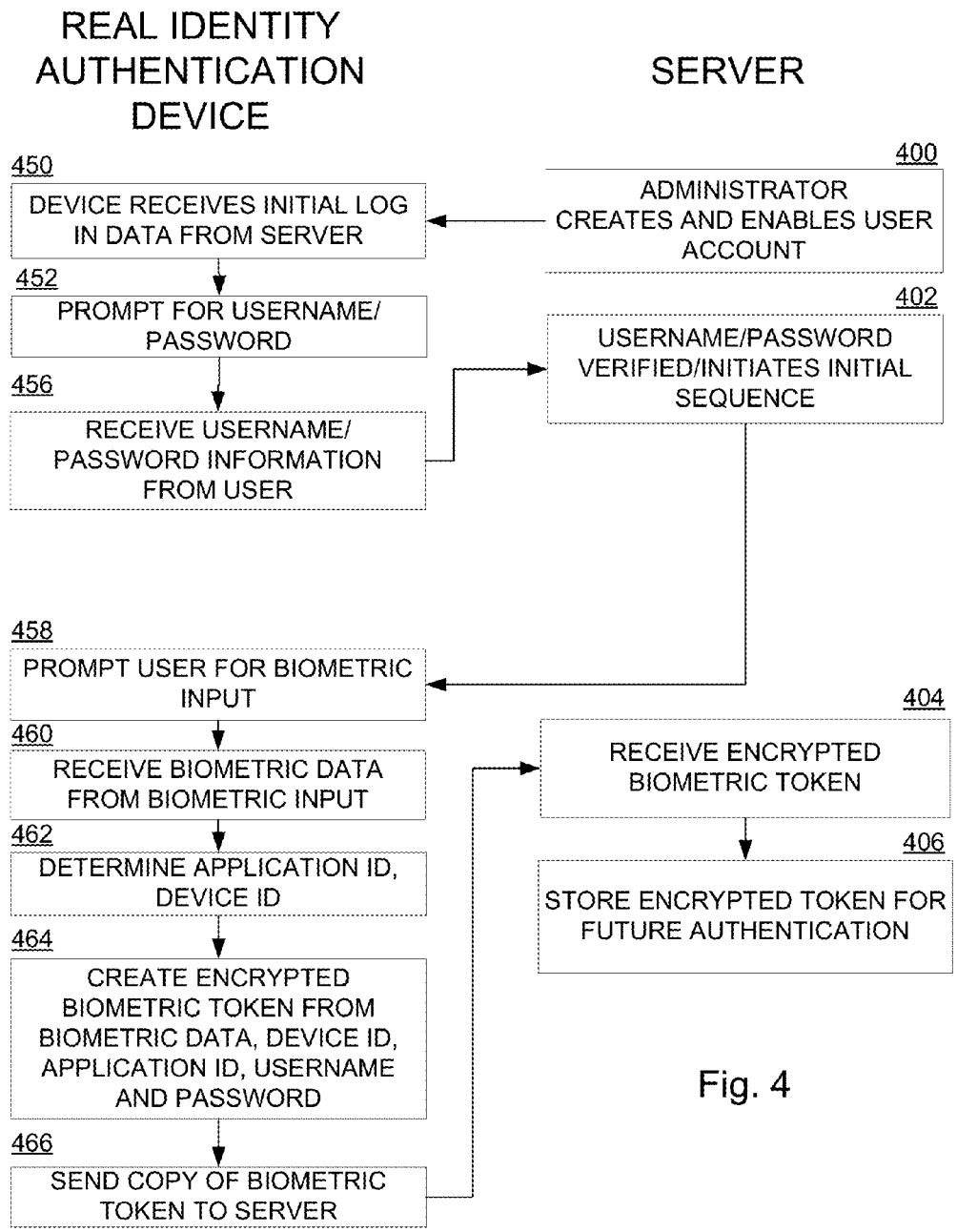
FIG. 4 is a flow diagram illustrating exemplary steps in an enrollment process according to an aspect of the invention.

FIG. 4 illustrates an enrollment process according to an aspect of the invention. At step 400, an administrator creates and enables a user account. This step may include the creation of a user profile, including user name, address, and other data, which may later be used to verify identity. The administrator is one with suitable access rights to the server data, and may be physically located with the server or may be remotely located. At step 450, the authentication device receives initial log-in information from the server. At step 452, the user is prompted for a username and password. At step 456, the device receives the input username and password and this information is sent to the server for verification. If the information is successfully verified, the authentication server, at step 402, instructs the device to prompt the user for biometric input at step 458. The user then interacts with the biometric sensor, which may be a fingerprint sensor, and the resulting biometric data is received by the device at step 460.

At step 462, identifying information for one or more applications being executed, as well as the device ID are determined. At step 464, an encrypted biometric token is created by the biometric token creation module 210 (FIG. 2) and encryption/decryption module (FIG. 2) from the determined device ID and application ID, as well as the biometric data, username and password. At step 466, a copy of the biometric token is sent to the server and received at step 404 and stored at step 406.

According to an aspect of the invention, from the aforementioned process, a unique biometric token, which may include encrypted data indicative of biometric data input by the user locally via the biometric sensor, device identification data, application identification data, username and password, is created by the device in a secure manner, preferably within firmware where it is not susceptible to malware or other security risks. The encrypted biometric token is then sent securely to an authentication server where it is stored for later use in an authentication process, which will be described below.

Figure 5:
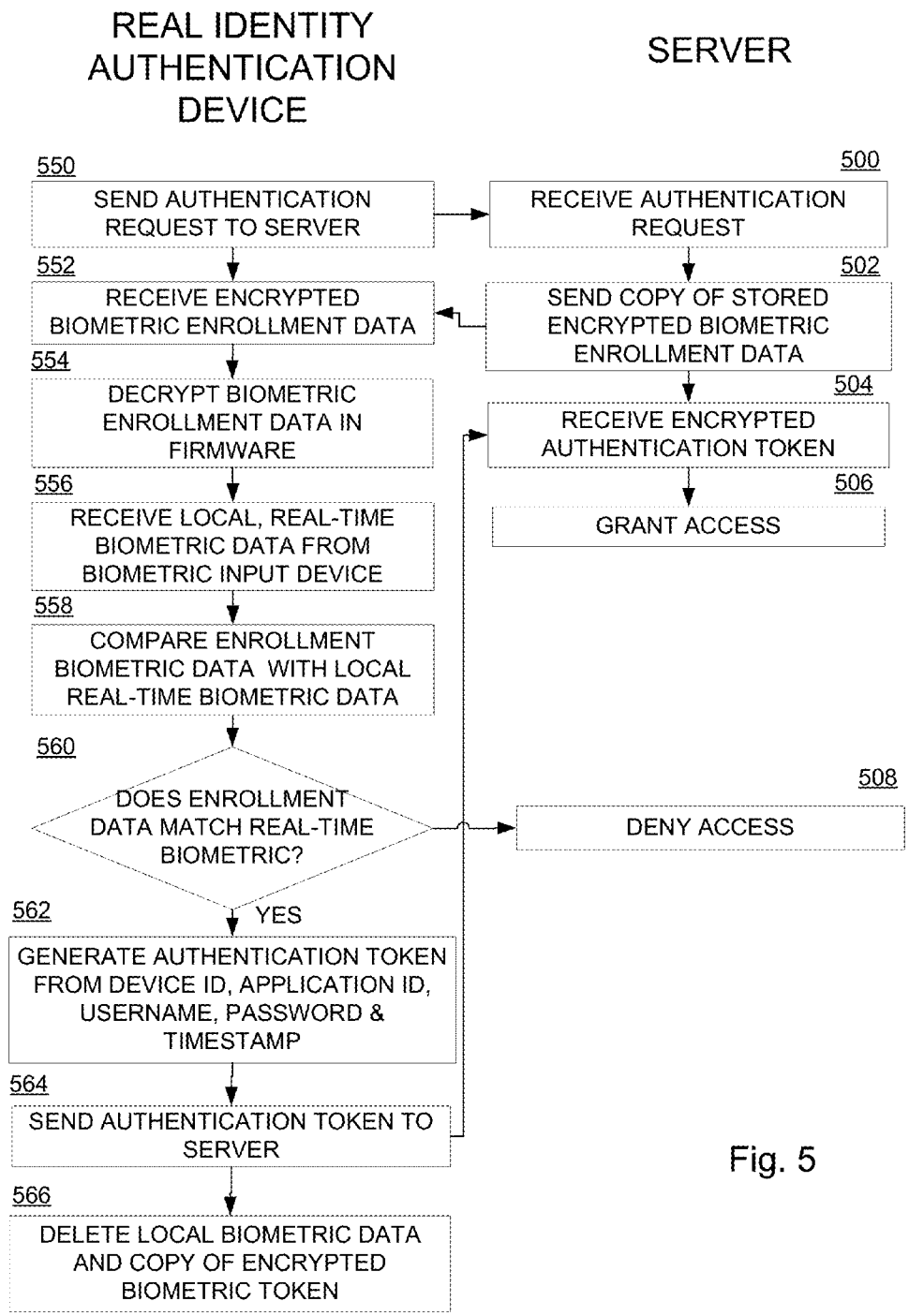
FIG. 5 is a flow diagram illustrating exemplary steps in an authentication process according to an aspect of the invention.

FIG. 5 depicts an authentication process according to an aspect of the invention. At step 550, an authentication request, which may be generated by a user's input or attempt to access a secure resource, is sent from the real identity authentication device 200 (FIGS. 1 and 2) to the server and received at step 500. In response, at step 502 the server sends a copy of a previously-stored encrypted biometric enrollment token to the real identity authentication device. Encrypted data indicative of the biometric token is received at step 552 and decrypted by the encryption/decryption module 220 (FIG. 2) in the real identity authentication device firmware in step 554. A user may then be prompted to interact with the biometric sensor 250 (FIG. 2) to create real-time biometric data, which is received by the real identity authentication device at step 556. At step 558, a comparison is done between the real-time biometric data and the decrypted enrollment biometric data.

Step 560 includes a decision point in which the system determines whether or not the enrollment biometric data matches the real-time biometric data. If not, the process denies access in step 508. If a match is found, the system generates an authentication token at step 562. The generated authentication token may be based upon the device identification data, application identification data, username, password and timestamp. At step 564, the authentication token is sent to the server and received there at step 504. User access is then granted by the server at step 506 and the user is authenticated. At step 566, the local biometric data and copy of encrypted biometric token are deleted for security purposes. Thus, no biometric data is stored on the device after the authentication process.

In the case of multiple users who are associated or registered with a single authentication device, after the above first user has authenticated, conducts a secure authenticated session and logs out, a second user may authenticate with the same device, where the system would perform the above steps for the second user, including sending an authentication request to the remote server from second user, and the step of receiving an encrypted biometric token from the remote server would include receiving a biometric token associated with the second user.

Figure 6:
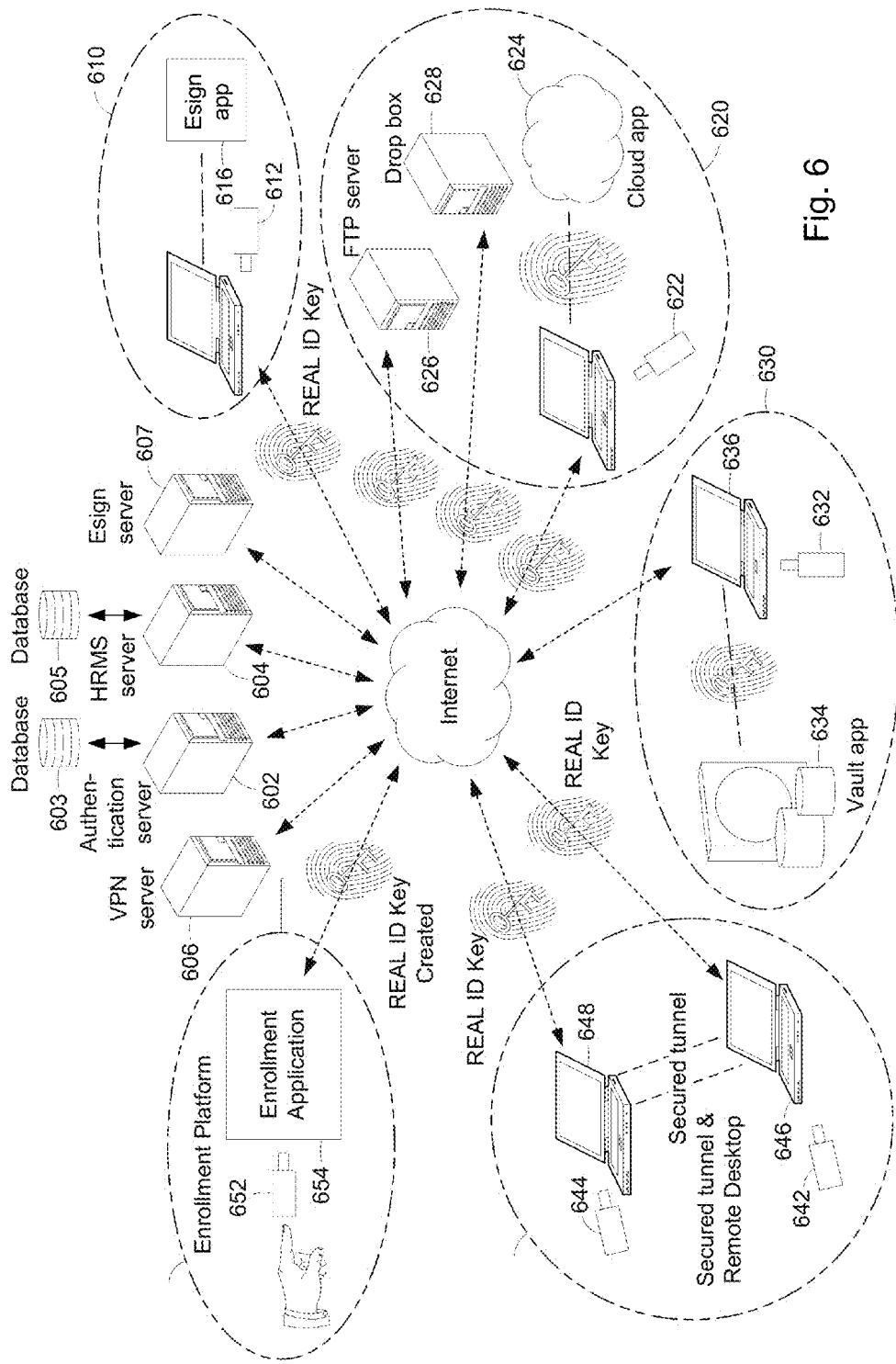
FIG. 6 illustrates another exemplary network environment suitable for supporting one or more real identity authentication device, method and system according to an aspect of the invention.

FIG. 6 illustrates a network architecture suitable for supporting one or more real identity authentication devices, processes and systems according to aspects of the invention. Generally, a number of different real identity authentication client environments 610, 620, 630, 640 and 650, each including an associated host computer or platform, and one or more associated applications, may be communicatively coupled to servers 602, 604, 606 and 607 via WAN. Each real identity authentication client environment supports one ore more associated real identity authentication device, 612, 622, 632, 642, 644 and 652. A real identity authentication server 602 provides for management of authentication data and support of authentication processes as described above, and may have an authentication database 603, which stores device information, including device identification data, associated biometric tokens, access levels and other data necessary for authenticating and managing the authentication of users. A Virtual Private Network (VPN) server 606 supports hosting of virtual private networks for one or more of the client environments. A Human Resources Management System (HRMS) server 604 and associated database 605 may store human resource information, such as employee profiles, security information, etc. An e-signature or e-sign server 607 may support electronic signatures by users on client platforms executing an associated e-signature or e-sign client application 610. In this example, real identification device 612 is used in conjunction with an e-sign application 610 to ensure that a user making an electronic signature is the true signatory on a document.

Client environment, such as 620, may support cloud computing functionality, with one ore more cloud applications 624 being supported by one or more associated servers (not shown). A File Transfer Protocol (FTP) 626 server may be provided for file storage and exchange. A server implementing a file sharing system in a drop box configuration, where users may drag and drop files to folder represented on the client platform, and where the folder is automatically synchronized with a corresponding folder or file storage location on the drop box server 628 such that other users may download or share it, may also be provided. In this case, the real identity authentication device 622 is used to support authentication of users desiring to access cloud applications, files on the FTP server, or files stored on or uploaded to the drop box 628.

A file storage vault application 634 may provide for encryption of files stored on local computer 636, such that all files stored on a hard disk or other storage device, are encrypted. In this example, real identity authentication device 632 operates in conjunction with the vault application to ensure that the user accessing stored files is the true, authorized user.

Client hosting environment 640 may include a local secured tunnel environment in which client computers 646 and 648 are communicatively linked via secured tunnel. In this example, respective real identity authentication devices 642 and 644 provide for user authentication and access to the secured tunnel communication functionality.

Client hosting environment 650 may include an enrollment application 654 which enables a user or administrator to enroll one or more associated real identity authentication devices 652 with the authentication server 602, in the manner explained above with regard to FIG. 4.

According to an aspect of the invention, the real identity authentication devices represented in FIG. 6 may represent use of the same authentication device in different client computing environments or may represent the use of respective different devices in different client computing environments. That is, for example, device 612, 632 and 652 may represent the same real identity authentication device used in different client environments 610, 630 and 650.

Figure 7:
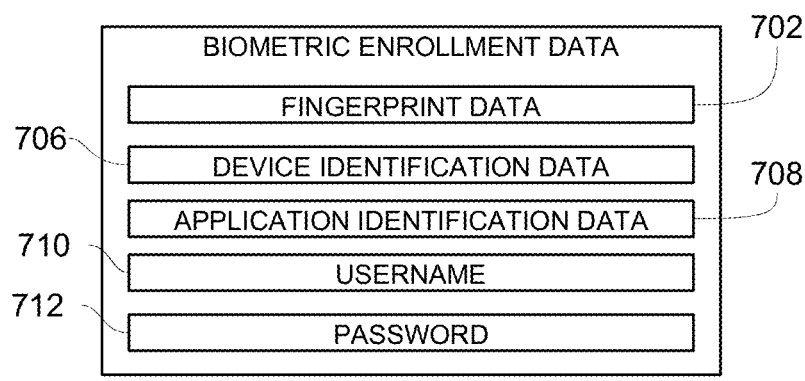
FIG. 7 is a schematic block diagram illustrating exemplary data inputs for creating a biometric token according to an aspect of the invention.

FIG. 7 is a schematic illustration of data that may be utilized in the creation of a biometric token according to an aspect of the invention. Inputs for token creation may include fingerprint or other biometric data 702. According to an aspect of the invention, fingerprint data 702 may include fingerprint data input from multiple user interactions with the biometric sensor (FIG. 2). The number of fingerprint interactions may be dictated by the particular biometric input device used. For example, known fingerprint sensors may require two fingerprint scans before data is output by the sensor. The fingerprint output data may represent a unique signature associated with a users fingerprint, based on patterns within the user's fingerprints. Aspects of the invention contemplate the use of biometric data other than fingerprint data, such as voiceprint data.

Inputs for the creation of the biometric token 700 may also include a device identification data layer 706, which may include the MAC address of the host client computer or a unique MAC address associated with the authentication device itself, as well as application identification data 708, username data 710 and password data 712. The input data may be passed as text strings to encryption/decryption module 220 (FIG. 2) and processed using a standard AES 256-bit algorithm to generate a unique biometric token which may later be decrypted by the encryption/decryption module 220 during the authentication process.

During the authentication process, when an authentication request is submitted by a user and client computer/device subsystem, the server looks for a biometric token with the same device ID as the ID of the device requesting the authentication. The authentication server may locate the token for a particular device using a lookup table, which maps device identifying information and user identifying information, such username or other information, to the biometric token associated with the particular device and particular user.

As will be recognized, devices, systems and process according to the invention provide the advantage of allowing real identity authentication devices to be managed in groups, and to associate one or more users, applications, access levels with a given device. In addition, a given user may be associated with more than one real identity authentication device.

Figure 8:
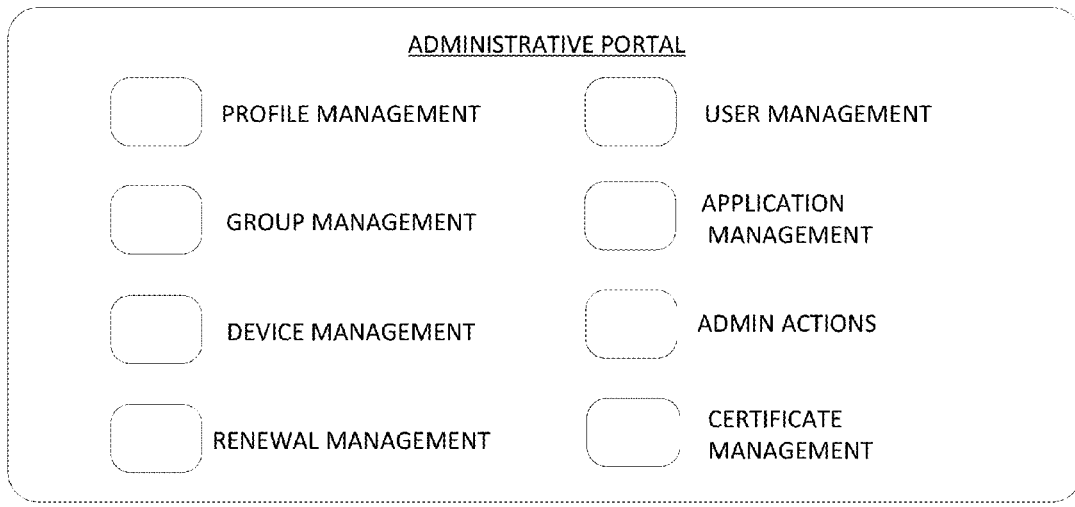
FIG. 8 illustrates an exemplary user interface screen for an administrative portal according to an aspect of the invention.

FIG. 8 illustrates an exemplary user interface for an administrative portal for managing groups and other functions according to aspects of the invention. To access the portal, an administrator with appropriate rights and credentials logs into the administrative control portal. A profile management control 802, which may include an icon that may be clicked on by the user, provides access to functions for creating a new user profile, populating the profile with user information such as name, contact information, and security access levels. A group management control 804 permits creation and management of groups users as will be further explained with regard to FIG. 9.

Figure 10:
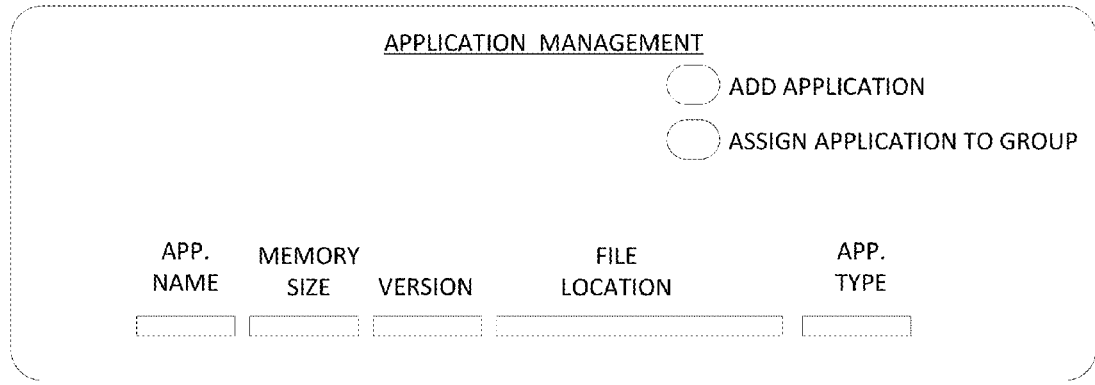
FIG. 10 illustrates an exemplary application management screen according to an aspect of the invention.

An application management control 812 allows an administrator to access functionality for managing applications, as will be further explained with regard to FIG. 10. A device management control 806 allows an administrator to access functionality for managing devices, as will be further explained with regard to FIG. 11. Renewal management control 808 allows management of automated renewals or expiration of access rights for users. User management control 810 allows management of users. Administrative actions control 814 provides access to administrative actions, such as pre-scripted email communications to users and groups based upon administrative actions. Certificate management control 816 provides access to manage digital certificates and it's level of security provided by the manufacturer of the certificate.

Figure 9:
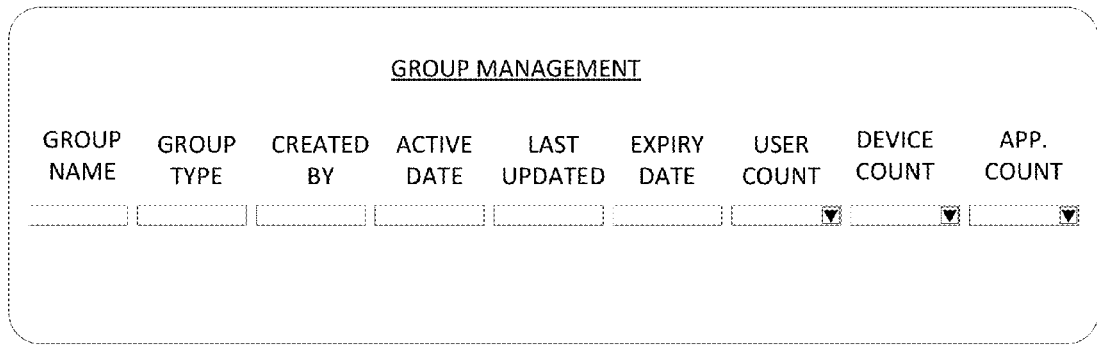
FIG. 9 illustrates an exemplary group management screen according to an aspect of the invention.

FIG. 9 illustrates a user interface display for a group management function according to an aspect of the invention. The group management function may be facilitated by a table format, with a the table having fields for GROUP NAME, GROUP TYPE, CREATED BY, ACTIVE DATE, LAST UPDATED, EXPIRY DATE, USER COUNT, DEVICE COUNT and APPLICATION COUNT. As will be recognized, an administrator may create new groups, which may be defined by a number of users or devices. The USER COUNT field may include a drop down menu, which allows the user to set a limit for the number of users. Alternatively, the USER COUNT field may display a current number of users who are assigned to the group. Similarly, DEVICE COUNT and APPLICATION COUNT fields display the number of devices assigned to the group and the number of applications assigned to the group. Additional displays may provide an inventory of users, devices and applications.

FIG. 10 illustrates a user interface screen for facilitating application management functionality according to aspects of the invention. ADD APPLICATION controls permit a user with administrative rights to enter information for a new application to be managed. ASSIGN APPLICATION TO GROUP control permits a user to assign one or more displayed applications to one or more groups. Fields for APPLICATION NAME, MEMORY SIZE, VERSION, FILE LOCATION and APPLICATION TYPE may display to the user and/or provide the user with the ability to input data into the system.

Figure 11:
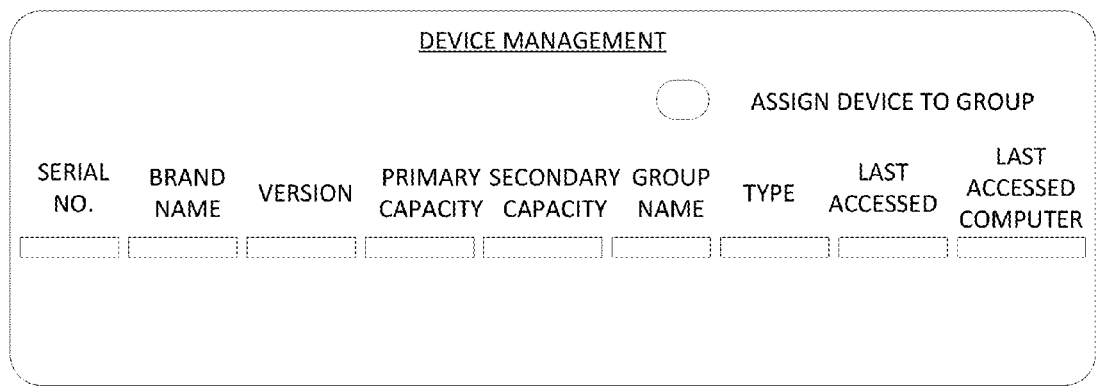
FIG. 11 illustrates an exemplary device management screen according to an aspect of the invention.

FIG. 11 illustrates a user interface screen for facilitating device management functionality according to aspects of the invention. Fields for SERIAL NUMBER, BRAND NAME, VERSION, PRIMARY CAPACITY, SECONDARY CAPACITY, GROUP NAME, TYPE, LAST ACCESS DATE and LAST ACCESSED COMPUTER permit a user to input and/or display corresponding information. BRAND NAME may list one of a number of commercial brands under which devices according to aspects of the invention are marketed to end users. PRIMARY and SECONDARY CAPACITY may provide information relating to the secure and public partitions of a corresponding device. A control for ASSIGN DEVICE TO GROUP provides additional interface functions to facilitate assignment of the displayed device to one or more groups.

It should be understood that implementation of other variations and modifications of the invention in its various aspects may be readily apparent to those of ordinary skill in the art, and that the invention is not limited by the specific embodiments described herein. It is therefore contemplated to cover, by the present invention any and all modifications, variations or equivalents that fall within the spirit and scope of the basic underlying principles disclosed and claimed herein.

As an example, it will be recognized that devices according to aspects of the invention utilize a quick and efficient method for storing and retrieving encrypted biometric tokens and decrypting them on a local device, which can be extended to other process that involves remote authentication using user identifying information. For example, biometric tokens can be retrieved based on information such as username and password, or can be retrieved based on passively obtained data, such as via a Radio Frequency Identification (RFID) tag.

What is claimed is:

1. A real identity authentication device comprising:
    a non-transitory, computer-readable medium for storing data and instructions;
    a biometric input device for collecting user biometric information;
    a processor for executing the instructions stored in the non-transitory computer-readable medium, the instructions, when executed, causing the processor to perform the steps of:
    sending an authentication request to a remote server;
    receiving an encrypted server biometric token from the remote server;
    decrypting the server biometric token in a controlled firmware environment, isolated from a host platform;
    collecting real-time biometric attributes, based on biometric interaction of a user with the biometric input device;
    collecting device identity information representing a unique identity of a device being used by the user;
    collecting application identity information representing at least one application being executed on the device being used by the user;
    comparing information in the server biometric token and the real time biometric attributes; and
    authenticating a user based upon information in the server biometric token matching the information indicative of the real time biometric attributes, wherein the step of authenticating includes creating an encrypted authentication token in response to matching information in the server biometric token to the real time biometric attributes, wherein the encrypted authentication token includes the device identity information and the application identity information; and sending the encrypted authentication token to the remote server to authenticate the user.

2. The device of claim 1, further comprising a host platform interface for coupling the device to a host platform, wherein the processor is configured to execute instructions in the non-transitory computer-readable medium independent of processing and storage resources on the host platform.

3. The real identity authentication device of claim 1, wherein the non-transitory computer-readable medium comprises a secure, firmware storage medium for storing the instructions which, when executed, cause the steps of collecting a real time biometric attributes, comparing the server biometric token and the real time biometric attribute, and creating an encrypted authentication token.

4. The authentication device of claim 1, wherein the real time biometric attributes are collected based on at least one user fingerprint.

5. The authentication device of claim 1, further comprising the step of deleting the real time biometric attributes after matching the server biometric token and the real time biometric attributes.

6. The authentication device of claim 1, wherein the encrypted authentication token includes information indicative of the time and information indicative of the real identity authentication device.

7. The device of claim 1, further comprising a universal serial bus (USB) interface for interfacing the device to a host platform.

8. The device of claim 1, wherein the instructions, when executed, cause the processor to perform the further steps of sending an authentication request to the remote server from a second user, and wherein the step of receiving an encrypted biometric token from the remote server includes receiving a biometric token associated with the second user.

9. The device of claim 1, wherein the instructions, when executed, cause the processor to perform the further steps of creating an enrollment biometric token and uploading the enrollment biometric token to an authentication server.

10. The device of claim 1, wherein the authentication token includes device identification data representing a MAC address of a host computer and application identification data.

11. A process for authenticating a user comprising:
    sending an authentication request to a remote server;
    receiving an encrypted server biometric token from the remote server;
    decrypting the server biometric token in a controlled firmware environment, isolated from a host platform;
    collecting real-time biometric attributes, based on biometric interaction of a user with the biometric input device;
    collecting device identity information representing a unique identity of a device being used by the user;
    collecting application identity information representing at least one application being executed on the device being used by the user;
    comparing information in the server biometric token and the real time biometric attributes; and
    authenticating a user based upon information in the server biometric token matching the information indicative of the real time biometric attributes, the authenticating step comprising the step of creating an encrypted authentication token in response to matching the server biometric token to the real time biometric attributes, wherein the encrypted authentication token includes the device identity information and the application identity information, and sending the encrypted authentication token to the remote server to authenticate the user.

12. The process of claim 11, further comprising the step of deleting the real time biometric attributes after matching the server biometric token and the real time biometric attributes.

13. The process of claim 11, further comprising further steps of sending an authentication request to the remote server from a second user, and wherein the step of receiving an encrypted biometric token from the remote server includes receiving a biometric token associated with the second user.

14. The process of claim 11, further comprising the steps of creating an enrollment biometric token and uploading the enrollment biometric token to an authentication server.

15. The process of claim 11, wherein the authentication token includes device identification data representing a MAC address of a host computer and application identification data.

\* \* \* \* \*